United States Patent
Lacaze et al.

(10) Patent No.: US 10,624,802 B2
(45) Date of Patent: Apr. 21, 2020

(54) SYSTEM FOR AUTOMATING WHEELCHAIR USER INGRESS, EGRESS, AND SECUREMENT ON A VEHICLE

(71) Applicant: Robotic Research, LLC, Gaithersburg, MD (US)

(72) Inventors: Alberto Daniel Lacaze, Potomac, MD (US); Karl Nicholas Murphy, Rockville, MD (US); Joseph Putney, Gaithersburg, MD (US); John Keyser, Gaithersburg, MD (US)

( * ) Notice: Subject to any disclaimer, the term of this patent is extended or adjusted under 35 U.S.C. 154(b) by 272 days.

(21) Appl. No.: 15/904,787

(22) Filed: Feb. 26, 2018

(65) Prior Publication Data
US 2018/0311085 A1    Nov. 1, 2018

Related U.S. Application Data

(60) Provisional application No. 62/490,382, filed on Apr. 26, 2017.

(51) Int. Cl.
*B60R 22/00*    (2006.01)
*A61G 3/06*    (2006.01)
(Continued)

(52) U.S. Cl.
CPC ............. *A61G 3/061* (2013.01); *A61G 3/062* (2013.01); *B60P 1/43* (2013.01); *B65G 67/24* (2013.01); *E05F 15/73* (2015.01); *E05F 15/77* (2015.01); *A61G 2203/30* (2013.01); *A61G 2203/70* (2013.01); *B60C 9/00* (2013.01); *B60R 22/04* (2013.01); *B60T 7/12* (2013.01); *B65G 2814/0347* (2013.01); *E05F 15/00* (2013.01);
(Continued)

(58) Field of Classification Search
CPC .... A61G 3/061; A61G 3/062; A61G 2203/30; A61G 2203/70; E05F 15/73; E05F 15/77; E05F 2015/765; E05F 15/00; B60P 1/43; B65G 67/24; B65G 2814/0347; E05Y 2900/531; B60Q 9/00; B60R 22/04; B60T 7/12; G05D 1/021; G05D 2201/0212
USPC .......... 701/49; 414/523, 537, 539, 545, 546, 414/812, 454
See application file for complete search history.

(56) References Cited

U.S. PATENT DOCUMENTS

| | | | |
|---|---|---|---|
| 2008/0079252 A1* | 4/2008 | Shutter | ............... A61G 3/0808 280/755 |
| 2011/0008140 A1* | 1/2011 | Hansen | .................. A61G 3/061 414/523 |

(Continued)

*Primary Examiner* — Shardul D Patel
(74) *Attorney, Agent, or Firm* — Radha Narayanan

(57) ABSTRACT

A system allowing a wheelchair bound user to embark and disembark a vehicle without assistance. The user requests entry into the vehicle. The vehicle is manually or autonomously driven into a safe position for ingress. The vehicle checks if the area is clear to open the door. The vehicle autonomously opens the door. The vehicle verifies the person is wheelchair bound. If the passenger is wheelchair bound, then: the vehicle verifies if the area is clear to deploy an inclined ramp or lift. The vehicle deploys the inclined ramp or lift. The vehicle waits until the user is on top of the lift and starts lifting the wheelchair bound person. The vehicle waits until the user at the correct height and transitions from the lift/ramp into the securement station inside of the vehicle. The vehicle verifies that the wheelchair is properly positioned for securement. The vehicle secures the wheel chair.

32 Claims, 1 Drawing Sheet

(51) Int. Cl.
  *B65G 67/24*    (2006.01)
  *B60P 1/43*    (2006.01)
  *E05F 15/73*    (2015.01)
  *E05F 15/77*    (2015.01)
  *B60T 7/12*    (2006.01)
  *E05F 15/00*    (2015.01)
  *B60C 9/00*    (2006.01)
  *G05D 1/02*    (2020.01)
  *B60R 22/04*    (2006.01)

(52) U.S. Cl.
  CPC ... *E05F 2015/765* (2015.01); *E05Y 2900/531* (2013.01); *G05D 1/021* (2013.01); *G05D 2201/0212* (2013.01)

(56) References Cited

U.S. PATENT DOCUMENTS

| | | | | |
|---|---|---|---|---|
| 2014/0356090 | A1* | 12/2014 | Cardona | A61G 3/0808 |
| | | | | 410/3 |
| 2016/0236546 | A1* | 8/2016 | Wojdyla | B60J 5/047 |
| 2018/0360676 | A1* | 12/2018 | Taschner | A61G 3/061 |
| 2019/0359458 | A1* | 11/2019 | Bartos | B66D 1/12 |

* cited by examiner

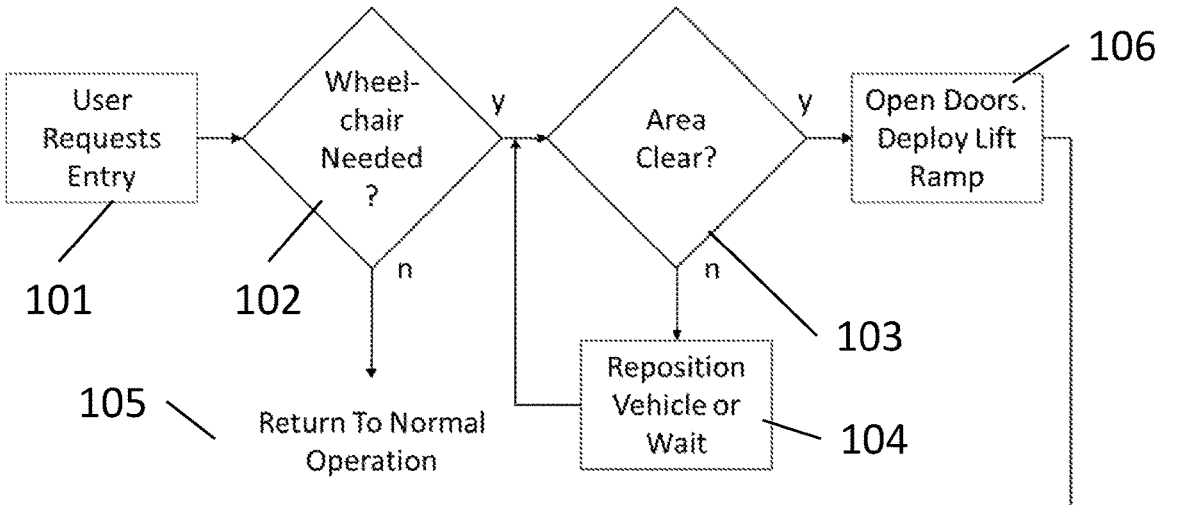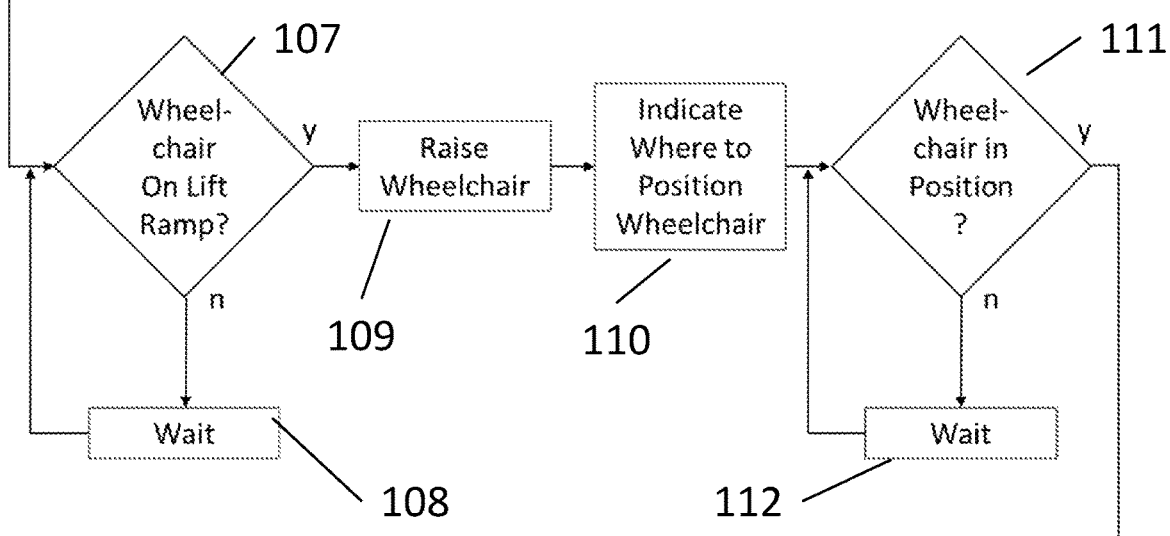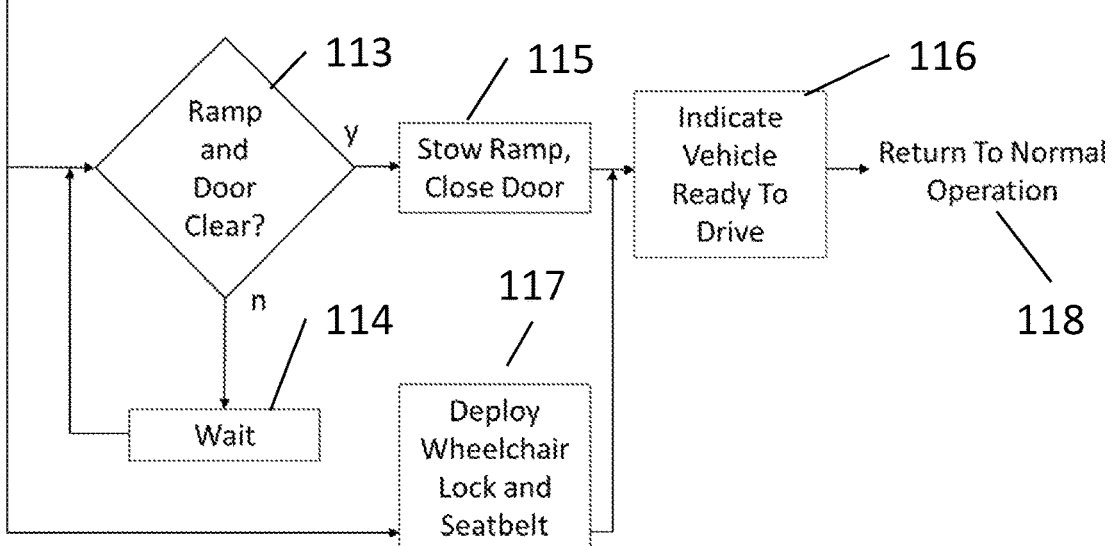

SYSTEM FOR AUTOMATING WHEELCHAIR USER INGRESS, EGRESS, AND SECUREMENT ON A VEHICLE

CROSS REFERENCE TO RELATED APPLICATIONS

This application claims priority from U.S. Patent Application Ser. No. 62/490,382, entitled "System for Automating Wheelchair User Ingress, Egress, and Securement on a Vehicle", filed on Apr. 26, 2018. The benefit under 35 USC § 119(e) of the United States provisional application is hereby claimed, and the aforementioned application is hereby incorporated herein by reference.

SEQUENCE LISTING OR PROGRAM

Not Applicable

TECHNICAL FIELD OF THE INVENTION

The present invention relates generally to wheelchair user ingress, egress, and securement on a vehicle. More specifically, the present invention relates to a system for automating wheelchair user ingress, egress, and securement on a vehicle.

BACKGROUND OF THE INVENTION

Current methods for entering and exiting vehicles with wheelchairs can be cumbersome, requiring many steps. Most of these steps need to be performed by a second, able-bodied person, as opposed to the individual in the wheelchair (in many cases, the driver of the vehicle). As the number of elderly increase in the United States and other countries, there is a need to automate the process for entering and exiting vehicles for the wheelchair-bound person.

The present invention will become particularly relevant with the advent of autonomous vehicles, since the handicap rider may be the only person in such a vehicle, and would not be able to count on the help of a driver or another passenger.

For example, current methods for wheelchair-accessible taxicabs require the driver of the taxicab to exit the vehicle, open the door, manually deploy a ramp, attach hooked tie-down straps to the front of the wheelchair, push the wheelchair up the ramp, attach straps now to the rear of the wheel chair, retract the ramp, secure the ramp, and close the door. In the approved wheelchair-accessible taxis for the city of New York, the driver of the vehicle (not the wheelchair passenger themselves) must perform a sequence of twenty-one steps before the wheelchair passenger is fastened, and the driver can continue with the trip before the fare starts.

A similarly cumbersome procedure must be followed when the wheelchair-bound person exits the vehicle. These burdensome methods not only inconvenience the driver, but also stop traffic, and most importantly, risk endangering the passenger if any of the steps are forgotten or not properly performed.

SUMMARY OF THE INVENTION

The proposed invention is a system that allows the wheelchair bound user to embark and disembark the vehicle without assistance. The system is composed of several subcomponents that perform an embarking sequence: The user requests entry into the vehicle. The vehicle is manually or autonomously driven into a safe position for ingress. The vehicle checks if the area is clear to open the door; the vehicle autonomously opens the door; The vehicle verifies if the person is wheelchair bound or not.

If the passenger is wheelchair bound, then: The vehicle verifies if the area is clear to deploy an inclined ramp or lift; The vehicle deploys the inclined ramp or lift; The vehicle waits until the user is on top of the lift and starts lifting the wheelchair bound person; The vehicle waits until the user at the correct height and transitions from the lift/ramp into the securement station inside of the vehicle; The vehicle verifies that the wheelchair is properly positioned for wheelchair securement. The vehicle secures the wheel chair Wheelchair passenger with adequate use of their arms can fasten their seat belts manually; otherwise, the vehicle secures the passenger with an automated harness.

The vehicle checks if the space necessary for retracting the lift/ramp is clear; The vehicle initiates the lift/ramp retracting process. The vehicle autonomously closes the door. The vehicle checks to see if all passengers are secured and ready to move. Finally, the vehicle changes status to either indicate human driver or autonomous driver that it is safe to initiate movement.

Definitions

FLIR (Forward Looking InfraRed) A thermal energy detection technology used in planes, ships, tanks and cars for recognizing distant objects in fog and in the dark. The term was coined to contrast this method with airborne "sideways tracking," which scans the environment below with a row of IR detectors moving like a push broom.

LIDAR (Light Detection And Ranging) An optical technology that senses the shape, motion and makeup of objects in the environment. It is used in a wide variety of disciplines, including airborne mapping and the measurement of atmospheric conditions. LIDAR works by transmitting laser signals using all light ranges (ultraviolet, visible, infrared) and amplifying the light that is scattered back through an optical telescope and photomultiplier tube. Sometimes called "laser radar," LIDAR does not technically use "radio" waves.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 1 is a flow chart of the method taught by the present invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

To automate the wheelchair access process, sensor systems must be used to detect the surroundings, the wheelchair-bound person, other humans, and any objects that may interfere with the operation of the system. In recent years, many sensor systems have become available that can detect humans.

For example, FLIRs can detect heat signatures from persons; LADARs (structured light sensors or stereo pairs) can be used to measure distances to a person, as well as generating 3D point clouds of such a person; and optical stereo pairs and deep learning methods can be used with video cameras to recognize humans. All these methods can be used for recognizing obstructions before deploying a ramp, but they can also be used for distinguishing the difference between a person walking, and a person in a wheelchair. These recognition algorithms make use of several characteristic features of the wheelchair, and the fact that the human is sitting on the wheelchair.

The following characteristics can be used for differentiating the wheelchair-bound passenger versus an able-bodied passenger: A wheelchair-bound person will be shorter when seated, compared to a standing individual.

Wheelchairs, by definition, have wheels; these wheels are touching the ground when the wheelchair is in use. LADAR, structured light, stereo, or visual classification algorithms can all be used to correctly classify the wheelchair.

Cameras or range sensors can be used to detect if the wheelchair is correctly positioned within the workspace of the securement mechanisms, and to guide the user to the proper location.

Finally, any of these sensors can be used to detect if the wheelchair is cleared from the space, in order to move the ramp and to verify for correct fastening.

The proposed invention is a system that allows the wheelchair bound user to embark and disembark the vehicle without assistance, whether the vehicle is equipped with multiple doors and with multiple ramps or a single door and single ramp. The vehicle can be a boat, ship, train, airplane, car, bus, van, or truck, recreational vehicle or any other moving vehicle.

The system is composed of several subcomponents that perform an embarking sequence: The user requests entry into the vehicle 101 and if vehicle determines if a wheel chair is needed 102. If it is not needed, the vehicle returns to a normal mode of operation 105.

If a wheel chair is needed, the vehicle is manually or autonomously driven into a safe position or clear area for ingress 103. If the area is not clear, the vehicle will reposition itself or wait until the area is clear 104. After vehicle checks if the area is clear to open the door 103, and the area is clear, the vehicle autonomously opens the door or deploys a lift or ramp 106.

Next, the vehicle verifies if the person is wheelchair bound or not. If the passenger is wheelchair bound, then: the vehicle verifies if the area is clear to deploy an inclined ramp or lift 105, and if clear, the vehicle deploys the inclined ramp or lift 107.

The vehicle waits 108 until the user is on top of the lift and starts lifting the wheelchair bound person 107. The vehicle waits 112 until the user at the correct height and position 111 and transitions from the lift/ramp into the securement station inside of the vehicle. The vehicle verifies that the wheelchair is properly positioned for wheelchair securement 107.

The vehicle secures the wheel chair. A wheelchair passenger with adequate use of their arms can fasten their seat belts manually; otherwise, the vehicle secures the passenger with an automated harness 117.

The vehicle checks if the space necessary for retracting the lift/ramp is clear 113, and if unclear, the vehicle waits 114 until the ramp and door are clear for closing or retraction. The vehicle initiates the lift/ramp retracting process 115. The vehicle autonomously closes the door. The vehicle checks to see if all passengers are secured and ready to move. Finally, the vehicle changes status to either indicate human driver or autonomous driver that it is safe to initiate movement or that the vehicle is ready to drive 116. And the vehicle returns to normal operation 118.

Some of the steps, indicated in the previous list, can be performed out of order. For example, we may choose to retract the ramp and close the door while the wheel chair and passenger are being secured. Many of the steps are not performed if the vehicle recognizes that the user is not using a wheelchair. For example, the vehicle will not deploy the lift/ramp and securing sequences.

A similar, but opposite procedure is performed when the passenger disembarks: The vehicle will verify that it is parked and its brake is engaged. The vehicle will indicate to the passenger that it is time to disembark. The vehicle will indicate to the passenger that it will unfasten the wheelchair and passenger. The vehicle will unfasten the wheelchair and passenger. The vehicle will verify there is enough space to deploy the ramp or lift and if there is enough space for the wheel chair to maneuver off of the lift/ramp. The vehicle will open the door. The vehicle will deploy the ramp or lift.

In the event, that an object obstructs the path of the ramp or lift while it's deploying, the vehicle will automatically halt and retract the lift/ramp. The vehicle will tell the passenger to move the wheelchair onto the lift/ramp. The vehicle will lower the lift (if the vehicle is equipped with a lift). The vehicle will wait until the user is off of the ramp and then retract the ramp. The vehicle will check if the doorway is clear. Once the doorway is clear, the vehicle will close the door. The vehicle will tell the driver or autonomous driver that the passenger has disembarked and is ready to continue move forward.

As with the embarkation process, some of the steps can be performed out of sequence or simultaneously. For example, we may choose to wait until the door has been opened and the ramp deployed before unfastening the wheelchair; or, these steps can be performed simultaneously to speed up the process. The current invention can be used for a disabled passenger, but it can also be used by a disabled driver, in which case the securement mechanism will position and secure the wheelchair as to allow the wheelchair-bound driver to access the controls of the vehicle.

The proposed system has six main components: an outside sensor, a ramp or lift, an internal sensor, an automatic wheelchair securement mechanism, an automatic or manual passenger harness mechanism, and an electronic control unit.

An outside sensor that checks if the door is clear to open and close, and if the ramp is clear to deploy or retract. This sensor, or combination of sensors, can also be used to determine if the person is wheelchair-bound or not A ramp or lift. There are many commercially available lifts/ramps. Some are composed of an incline, others lower and raise a platform in which the wheelchair sits. There is also a large variety of mechanisms for deploying and retracting these ramps.

An internal sensor that is used for making sure that the lift/ramp is unobstructed while deploying or retracting, and verifies that the wheelchair is in the correct position and ready to initiate the securement mechanism.

Automatic wheelchair securement mechanism. There is a variety of commercially available mechanisms. Some have arms that compress the sides of the wheelchair and generate enough friction to secure the wheelchair in place. There are other mechanisms that automatically deploy a seatbelt that holds both the user and its wheelchair. Finally, there are specialized wheelchairs with electromagnets that automatically connect with the securement mechanism in the vehicle.

Automatic or manual passenger harness mechanism. Wheelchair passenger with adequate use of their arms can fasten their seat belts manually; otherwise, the vehicle secures the passenger with an automated harness.

An electronic control unit that coordinates user inputs/displays, sensors, and actuators to perform the functional sequences presented in the previous section. This computational node contains the logic necessary to perform this procedure safely and expediently. An algorithm determines which exit door is more convenient for the user. The algorithm includes measures of distance between the securement mechanism of the door and/or might look for blockages inside of the vehicle. A transmitter for diagnostics and status data to a remote monitoring station or user device, such as a smart phone application or webpage may also be included and controlled by the electronic control unit.

The sensors notify the human or autonomous driver to reposition the vehicle when the area for ramp deployment is not clear. The sensors are not only used to figure out if the deployment of the ramp and door are clear, but there is also enough room for the wheelchair user to maneuver into and outside of the ramp. A sensor that classifies the terrain of the ramp landing as to avoid puddles, mud, sand, or other challenging terrain. A charging mechanism that charges the wheelchair while secured may also be employed. In some instances, the ramp is not necessary or not deployed because the floor of the vehicle and the ground are at the same level.

The system for automating the embarkation and disembarkation of wheelchair users from a vehicle, the system is composed of: a ramp used for bridging the support surface outside of the vehicle to the inner floor of the vehicle; a wheelchair securement mechanism mounted to the vehicle; a sensor for verifying the safety of the movement of the ramp used for bridging the support surface outside of the vehicle to the inner floor of the vehicle; and a sensor for verifying a wheelchair securement mechanism mounted to the vehicle; and/or providing instructions to the user for verifying the safety of the movement of the ramp used for bridging the support surface outside of the vehicle to the inner floor of the vehicle and verifying a wheelchair securement mechanism mounted to the vehicle; and a passenger harness mounted to the vehicle.

The present invention teaches a motorized system for opening and closing the door. A sensor or algorithm automatically detects whether a person is wheelchair-bound or not, and initiates ramp deployment and securement procedures if the user is wheelchair bound. A means of verifying or applying vehicle safety brakes while the process of embarkation or disembarkation are under way is also employed.

In another embodiment, a speaker that guides the user to the next step in the embarkation or disembarkation sequence is incorporated. A button outside of the vehicle that will initiate the embarkation sequence and or inside of the vehicle that will initiate the disembarkation sequence may also be used.

In another embodiment, a wireless receiver on the vehicle that is triggered by a smart phone or button in the wheelchair for initiating the embarkation and disembarkation procedures. An emergency or panic button located within reach of the user to alert driver or some other someone else of possible dangerous situation or medical emergency can also be provided. A microphone outside of the vehicle and/or inside of the vehicle that receives commands from a user to start, pause, interrupt, or abort the embarkation or disembarkation procedures.

Multiple securement mechanisms can be used in another embodiment, so as to allow for multiple wheelchair users to use the vehicle simultaneously. The securement mechanism is placed in such a way as to allow the user to reach the vehicle controls and manually or autonomously drive the vehicle.

In another embodiment, the present invention includes a mechanism that alerts surrounding traffic of the embarkation or disembarkation maneuver taking place has to direct traffic around the vehicle or to stop traffic while the procedure is ongoing (for example, turn on blinkers or engage a stop sign). The system also verbally guides the user into the wheel chair securement mechanism; and indicates distance and direction. A visual display to guide the user through the embarkation and disembarkation process.

In still another embodiment, the ramp is not attached to the vehicle, but is attached to the vehicle stopping area (bus stop). A sensor is located at the bus stop to verify mating between the ramp and vehicle.

In yet another embodiment, an empty wheelchair is lowered by the lift ramp, allowing an elderly person or mobility challenged person to sit in the wheelchair at ground level and the system is used for bringing the mobility challenged person into the car and automatically secures the wheelchair and person.

In another embodiment, the present invention teaches an interface that allows a motorized wheelchair to be automatically controlled by the vehicle to perform the maneuvers of moving into the ramp and positioning prior to initiating the fastening procedure. The interface automatically connects a vital sign system in the wheelchair to the vehicle network and allows the driver or intelligent vehicle to monitor the user.

The present invention can optionally be provided with an on-demand reservation system for scheduling a pickup and drop-off that meet accessibility needs. The on-demand scheduling system for optimizing the schedule of a fleet of vehicles matches accessibility needs.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A system for automating the embarkation and disembarkation of wheelchair users from a vehicle, the system is composed of:
   a ramp used for bridging the support surface outside of the vehicle to the inner floor of the vehicle;
   a wheelchair securement mechanism mounted to the vehicle;
   a sensor for verifying the safety of the movement of the ramp used for bridging the support surface outside of the vehicle to the inner floor of the vehicle; and
   a sensor for verifying a wheelchair securement mechanism mounted to the vehicle; and/or
   providing instructions to the user for verifying the safety of the movement of the ramp used for bridging the support surface outside of the vehicle to the inner floor of the vehicle and verifying a wheelchair securement mechanism mounted to the vehicle; and a
   passenger harness mounted to the vehicle.

2. The system of claim 1, further comprising
   a motorized system for opening and closing the door.

3. The system of claim 1, further comprising
   a sensor or algorithm that automatically detects whether a person is wheelchair-bound or not, and initiates ramp deployment and securement procedures if the user is wheelchair bound.

4. The system of claim 1, further comprising
   a sensor such as a camera, ladar, radar, acoustic, or touch that verifies or applies
   vehicle safety brakes while the process of embarkation or disembarkation are under way.

5. The system of claim 1, further comprising
   a speaker that guides the user to the next step in the embarkation or disembarkation sequence.

6. The system of claim 1, further comprising a button outside of the vehicle that will initiate the embarkation sequence and or inside of the vehicle that will initiate the disembarkation sequence.

7. The system of claim 1, further comprising a wireless receiver on the vehicle that is triggered by a smart phone or button in the wheelchair for initiating the embarkation and disembarkation procedures.

8. The system of claim 1, further comprising
   a microphone outside of the vehicle and/or inside of the vehicle that receives commands from a user to start, pause, interrupt, or abort the embarkation or disembarkation procedures.

9. The system of claim 1, further comprising
   multiple securement mechanisms, so as to allow for multiple wheelchair users to use the vehicle simultaneously.

10. The system of claim 1, wherein
    the securement mechanism is placed in such a way as to allow the user to reach the vehicle controls and manually or autonomously drive the vehicle.

11. The system of claim 1, wherein
    the vehicle is autonomously driven.

12. The system of claim 1, wherein
    the vehicle is equipped with multiple doors and with multiple ramps.

13. The system of claim 1, wherein
    the sensors notify the human or autonomous driver to reposition the vehicle when the area for ramp deployment is not clear.

14. The system of claim 1, wherein
    the sensors are not only used to figure out if the deployment of the ramp and door are clear, but there is also enough room for the wheelchair user to maneuver into and outside of the ramp.

15. The system of claim 1, further comprising
    a sensor that classifies the terrain of the ramp landing as to avoid puddles, mud, sand, or other challenging terrain.

16. The system of claim 1, further comprising
    a mechanism that alerts surrounding traffic of the embarkation or disembarkation maneuver taking place has to direct traffic around the vehicle or to stop traffic while the procedure is ongoing (for example, turn on blinkers or engage a stop sign).

17. The system of claim 1, further comprising
    an algorithm that determines which exit door is more convenient for the user; and
    the algorithm includes measures of distance between the securement mechanism of the door and/or might look for blockages inside of the vehicle.

18. The system of claim 1, further comprising
    an emergency or panic button located within reach of the user to alert driver or some other someone else of possible dangerous situation or medical emergency.

19. The system of claim 1, wherein
    the ramp is not attached to the vehicle, but is attached to the vehicle stopping area or bus stop.

20. The system of claim 19, wherein
    a sensor is located at the bus stop to verify mating between the ramp and vehicle.

21. The system of claim 1, wherein
    the ramp is not necessary or not deployed because the floor of the vehicle and the ground are at the same level.

22. The system of claim 1, wherein the vehicle is a boat, ship, train, airplane, car, bus, van, or truck, recreational vehicle or any other moving vehicle.

23. The system of claim 1, wherein
    an empty wheelchair is lowered by the lift ramp, allowing an elderly person or mobility challenged person to sit in the wheelchair at ground level; and
    the system is used for bringing the mobility challenged person into the car and automatically secures the wheelchair and person.

24. The system of claim 1, further comprising
    a charging mechanism that charges the wheelchair while secured.

25. The system of claim 1, further comprising
    an interface that allows a motorized wheelchair to be automatically controlled by the vehicle to perform the maneuvers of moving into the ramp and positioning prior to initiating the fastening procedure.

26. The system of claim 1, further comprising
an interface that automatically connects a vital sign system in the wheelchair to the vehicle network and allows the driver or intelligent vehicle to monitor the user.

27. The system of claim 1, wherein
verbally guides the user into the wheel chair securement mechanism; and
indicates distance and direction.

28. The system of claim 1, further comprising
a transmitter for diagnostics and status data to a remote monitoring station or user device, such as a smart phone application or webpage.

29. The system of claim 1, further comprising
a visual display to guide the user through the embarkation and disembarkation process.

30. The system of claim 1, further comprising
an on-demand reservation system for scheduling a pickup and drop-off that meet accessibility needs.

31. The system of claim 1, further comprising
an on-demand scheduling system for optimizing the schedule of a fleet of vehicles to match accessibility needs.

32. The system of claim 1, further comprising
a manual or automated passenger harness.

* * * * *

UNITED STATES PATENT AND TRADEMARK OFFICE
CERTIFICATE OF CORRECTION

PATENT NO. : 10,624,802 B2
APPLICATION NO. : 15/904787
DATED : April 21, 2020
INVENTOR(S) : Alberto Daniel Lacaze et al.

It is certified that error appears in the above-identified patent and that said Letters Patent is hereby corrected as shown below:

In the Specification

Please ADD, immediately following the "CROSS-REFERENCE TO RELATED APPLICATIONS" Section at Column 1, Line 15, a NEW SECTION, as follows:
STATEMENT REGARDING FEDERALLY SPONSORED RESEARCH
This invention was made with government support under Contract No. W56HZV-18-C-0022, awarded by the U.S. Army Contracting Command. The government has certain rights in the invention.

Signed and Sealed this
Twenty-first Day of March, 2023

Katherine Kelly Vidal
*Director of the United States Patent and Trademark Office*